(12) United States Patent
Becht

(10) Patent No.: US 8,776,978 B2
(45) Date of Patent: Jul. 15, 2014

(54) CLUTCH WITH ADJUSTING DEVICE

(75) Inventor: Marco Becht, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1391 days.

(21) Appl. No.: 12/214,649

(22) Filed: Jun. 20, 2008

(65) Prior Publication Data
US 2009/0000900 A1 Jan. 1, 2009

(30) Foreign Application Priority Data

Jun. 21, 2007 (DE) .......................... 10 2007 028 669

(51) Int. Cl.
*F16D 13/75* (2006.01)

(52) U.S. Cl.
USPC .................. 192/111.12; 192/70.252

(58) Field of Classification Search
USPC ................ 192/111.11, 111.12, 109 R, 70.52
See application file for complete search history.

(56) References Cited

U.S. PATENT DOCUMENTS 6,533,094 B2 * 3/2003 Uehara et al. ............ 192/70.252
7,124,871 B2   10/2006 Friedmann et al.
2003/0164274 A1   9/2003 Feldhaus et al.
2004/0026184 A1 * 2/2004 Baumann et al. ............. 188/72.7
2005/0029858 A1 * 2/2005 Forster et al. ................... 303/20
2006/0027436 A1   2/2006 Weidinger

FOREIGN PATENT DOCUMENTS

| DE | 10 2004 009 832 A1 | 9/2004 |
| DE | 10 2005 003 505 A1 | 9/2005 |
| EP | 1 642 211 A1 | 2/2006 |
| FR | 2 893 370 | 5/2007 |
| WO | WO2007/057596 A1 | 5/2007 |
| WO | WO 2008/058508 A1 | 5/2008 |

* cited by examiner

*Primary Examiner* — David D Le
*Assistant Examiner* — Ryan Dodd
(74) *Attorney, Agent, or Firm* — Davidson, Davidson & Kappel, LLC

(57) ABSTRACT

A friction clutch for a motor vehicle is provided. The friction clutch is disengaged when unpowered and engaged by axial movement of an actuating lever operated by an actuating device via a further lever. In the event of overtravel traversed beyond the unpowered state the friction clutch compensates for an incorrect axial gap between the friction surfaces provided in a friction clutch caused by wear. The friction clutch includes a switchable stop provided on the actuating device. The switchable stop releases an overtravel path for the further lever when a detected engagement path of the further lever exceeds a predefined length.

20 Claims, 5 Drawing Sheets

CLUTCH WITH ADJUSTING DEVICE

This claims the benefit of German Patent Application No. 10 2007 028 669.6, filed on Jun. 21, 2007 and hereby incorporated by reference herein.

The invention relates to a friction clutch engaged under pressure by an actuating device, having an adjusting device to compensate for an incorrect gap between the friction contact surfaces.

BACKGROUND

Friction clutches of this sort are known for example from DE 10 2005 003 505 A1. In general, such incorrect gaps are brought about over the operating life of the friction clutch through wear of the friction linings of the clutch plate and procedures setting the lining resiliency. An expedient way to compensate for wear is through compensating for the incorrect gap by setting the ideal axial spacing of the friction surfaces of the clutch relative to each other by twisting ramp/opposing ramp systems that operate on the circumference opposite each other in such a way that the desired spacing relationships are again produced between the actuating lever, which may take the form of a diaphragm spring, and a stop on the clutch cover.

When overtravel is used as the means of compensating for the incorrect gap, the friction clutch is operated by actuation beyond the engaged or disengaged state, by pressing or relaxing the actuating lever accordingly by the actuating system beyond such state. As that is done, the actuating lever lifts off of a device that blocks the ramp/opposing ramp system, so that the latter—usually supported by a corresponding power storage device—can compensate for the incorrect gap by turning the ramps contrary to the opposing ramps. The magnitude of the adjustment depends substantially on the position of the actuating lever. For this type of adjustment by producing overtravel, adjusting systems have proven especially advantageous which provide a device between the ramp/opposing ramp system and the actuating lever by means of which an adjustment is accomplished not by covering the entire overtravel but by adjusting in increments. To this end a so-called drive spring-worm gear device can be used, in which the overtravel and the resulting additional axial motion of the engagement bearing in the direction of disengagement, and the tilting of the actuating lever which in turn results, produces tangential travel of a tongue provided on the drive spring, which thereby jumps over a tooth of the worm gear wheel. At the next engagement procedure, the worm gear twists the ramp/opposing ramp system by a predefined amount. If the wear is greater than the amount adjusted by the engagement travel, the adjustment is repeated in the subsequent engagement procedures until the wear has been compensated for.

Typical actuating systems fulfill the function of axially displacing the actuating lever, by prescribing a defined engagement travel distance depending on the desired degree of frictional engagement between the clutch friction surfaces and the output-side friction linings for example of a clutch plate. In this connection, DE 10 2004 009 832 A1 reveals an actuation system in the form of a lever system in which a lever acts on the actuating lever through a roller bearing.

SUMMARY OF THE INVENTION

An object of the invention is to improve a friction clutch of the named species in such a way that the reproducibility of the adjustment can be improved further. It should be possible to make an improvement without high costs, and it should be adaptable to the existing actuating systems.

The invention provides a friction clutch for a motor vehicle which is disengaged when in the unpowered state and is engaged by axial movement of an actuating lever operated by an actuating device by means of a lever, and an incorrect axial gap between friction surfaces provided in the friction clutch is compensated for during overtravel beyond the motion in the unpowered state, where a switchable stop provided on the actuating device releases the lever for overtravel when a detected engagement travel distance of the lever exceeds a prescribed value. Through the choice of two conditions, namely a so-called overtravel stop at which the clutch can be adjusted intentionally and a stop for conventional clutch procedures, exact positioning of the lever and thus of the actuating lever on the friction clutch can be prescribed, so that in the event that an incorrect gap requires compensation, reproducible conditions may prevail. Through the exact setting of the stop, the actuating lever may be at the position that allows adjustment to the original state of the clutch. Furthermore, the switchable stop may make it possible to use actuating devices that return automatically to the non-tensioned state, for example through spring force, so that a complicated approach to this non-tensioned state through use of a clutch actuating system may not be needed. Depending on whether an adjusting procedure is to be initiated or the friction clutch is to be disengaged normally, the actuating device returns to the stop of the non-tensioned state or—if an adjustment is to be made—with the switchable stop swiveled; in that way it moves to the housing stop in a way that defines further travel for the lever, which may be necessary to adjust the friction clutch.

It can also be of benefit if, after the incorrect gap has been compensated for, the stop again prevents the overtravel. This means that the stop which has been moved out of contact range of the lever may be moved back into the contact range of the lever after an adjustment has been made, so that it can again fulfill its function as a stop until the next adjustment. In an advantageous design, this can be accomplished by having the lever itself switch this stop back again after an adjustment.

Viewed from the perspective of its function, an advantageous exemplary embodiment can comprise a friction clutch in which, in the course of an actuation of the friction clutch, the lever of the actuating system may carries with it a controlling component provided with a ramp, against a first return force. This controlling component may then works together with that ramp, acting on a controlled component that is provided with an opposing ramp and has a stop for the lever, in that the ramps slide on each other and the opposing ramp may be forced through the ramp provided on the controlling component and may thereby be moved perpendicular to the axial movement described by the lever against a second return force. With the lever displaced axially during an engagement process, this may results in swiveling of the stop attached to the controlled component, so that the stop may moves away from the contact surface of the lever.

With increasing engagement travel, which is a measure of the increasing degree of wear of the friction clutch and thus a measure of the need for an adjustment to compensate for the incorrect gap, at the engagement distance prescribed for a necessary adjustment provision may be made so that the controlling and controlled components may be fixed in their current position. In that position, as the friction clutch is disengaged it becomes ineffectual for the lever as a result of having been swiveled out with the controlled component, and the lever runs back until it reaches an axially set-back housing stop, at which compensation for the incorrect gap may ensues as a result of the great deflection of the actuating lever.

It has been found especially advantageous here if the lever has an additional device, for example a ramp, which moves the controlled component beyond the current position against the second return force when the overtravel is taken, so that the two components may be released again from their fixed position.

The previously described ramp mechanisms, which are deflected against corresponding return forces during clutch actuation processes, can be realized simply through beneficial design of the components in the form of leaf springs. For example, the controlling component can be formed by a controlling leaf spring clamped in place on one end, whose free end has a ramp that is carried along by the lever during an engagement process against the first return force formed by the leaf spring constant. In this way, the function of the ramp can be combined with the element that brings about the return, in a component that is easily produced.

Furthermore, the controlled component can be formed by a controlled leaf spring clamped in place by one end, whose free end has a ramp that corresponds to the ramp of the controlling leaf spring, and which during an engagement process may be moved contrary to the return force from the controlling leaf spring, which is formed by the leaf spring constant and acts perpendicular to the first return force, while a stop attached to the controlled leaf spring swivels out of a contact surface with the lever as the engagement travel distance increases. Here too, the function of the ramp and of the force that resets the latter may be combined in a single component. It is especially advantageous if both leaf springs are produced as single pieces, for example by being stamped out of suitable spring steel and then bent according to their function. Corresponding behavior of the two ramps means that their shapes may be matched with each other in such a way that the controlled leaf spring exerts a force on the ramp while being displaced, so that through appropriate oblique positioning of the ramps, the displacement of the ramp of the controlling component brings about a reversal of direction of the controlled component. To this end, the ramp surfaces may be advantageously oriented parallel to each other. To reduce friction forces of the ramp surfaces on each other, the surfaces can be treated appropriately, for example by coating, polishing, and/or greasing.

As soon as an engagement path is detected that requires an adjustment of the friction clutch, according to the invention the stop should be swiveled out, so that the lever of the actuating system can execute an overtravel. Advantageously therefore, when the ramps are in such a position relative to each other an opening may be provided in one leaf spring, into which a locating key of the other leaf spring meshes in such a way that the two leaf springs are locationally fixed in relation to each other in this position. For example, the locating key can snap into the opening elastically. Here the locating key can be provided in the controlling or controlled component and the opening correspondingly in the other component. The fixing causes the controlling component to remain in its position, which corresponds to an engagement distance at which an adjustment may be made. It goes without saying that in this situation the lever can nevertheless be moved back past the untensioned position to the housing stop, because while the controlling leaf spring may be carried along in the direction of engagement by a one-sided guidance system, in the disengagement direction it remains in contact with the lever because of the return force. But the fixing on the controlled leaf spring retains the latter in this position against its return force. On the other hand, the controlled leaf spring also, and with it the stop attached to it, which can be riveted, press-fitted, bolted, welded or connected in some other way to the leaf spring, may remain in its swiveled-out position, so that the lever can traverse the excess distance.

To block this overtravel for the other actuation process until the next adjustment may be due, it is advantageous if the fixing of the two components is released again automatically immediately after the adjustment is completed. To this end, after a compensation for the incorrect gap the position fixing can be suspended by means of an unblocking profile provided on the lever, such as an unblocking lug, where the latter moves the controlled leaf spring against the controlling leaf spring against the second return force far enough so that the opening and the locating key are separated from each other again. This unblocking profile can also be formed by a ramp, which meshes with an opposing profile of the controlled leaf spring and shifts it accordingly.

The forms of all profiles may be matched advantageously to the motion sequences. Corresponding designs not only with a linear surface, but also as curved, epicyclic and otherwise-shaped surfaces may be components of the invention.

BRIEF DESCRIPTION OF THE DRAWINGS

The invention will be explained in greater detail on the basis of FIGS. 1 through 7. The figures show the following.

DETAILED DESCRIPTION

Figure 1:
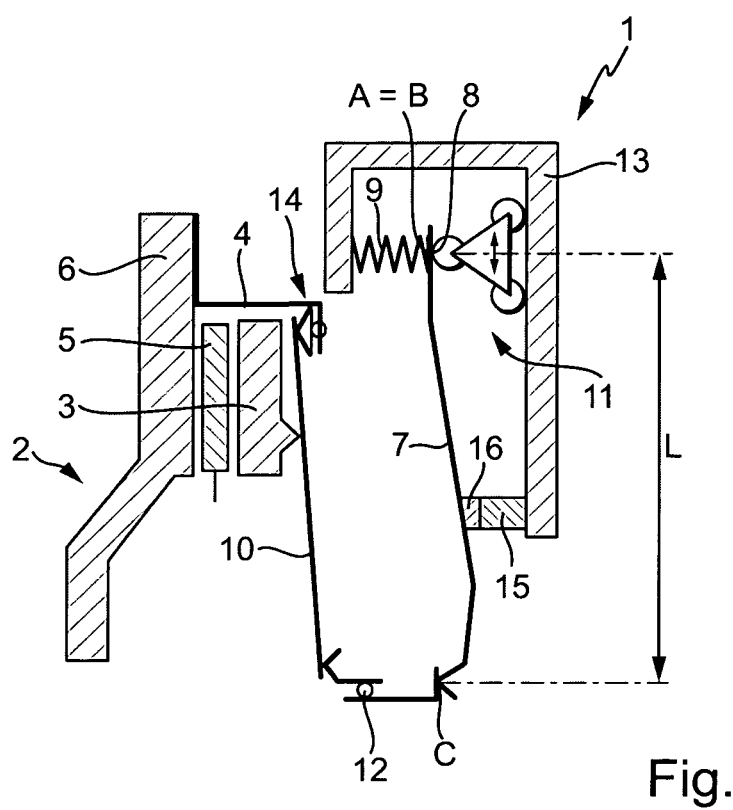
FIG. 1: a schematic depiction of a friction clutch with an adjusting device.

FIG. 1 shows a schematic depiction of a clutch system 1 with a friction clutch 2. Friction clutch 2 consists essentially of an opposing pressure plate 6, a clutch plate 5, a pressure plate 3, a clutch cover 4 and an actuating lever 10, which is constructed here as a diaphragm spring. The friction clutch 2 depicted in FIG. 1 as an example is what is known as a pressure engaged clutch, which is disengaged when in the force-free state, and is caused to engage when actuating lever 10 is subjected to a force specified by the disengager through an axial movement of actuating lever 10, by bringing the frictional surfaces of the clutch plate 5 on the one hand and the friction surfaces of pressure plate 3 and of opposing pressure plate 6 into frictional engagement. Accordingly, in the depicted exemplary embodiment the clutch actuating device is what is known as a lever engager 11, and the bearing on actuating lever 10 is an engagement bearing 12. It goes without saying that in so-called pressure disengaged clutches a corresponding use of the clutch actuating device as a lever disengager can be similarly advantageous, and is therefore also included in the disclosure.

The lever engager for friction clutch 2 consists substantially of a lever system which is situated on a support 13 and firmly connected to the housing. The lever engager acts by means of a lever 7 of length L on engagement bearing 12, which is situated around a transmission input shaft and which as an axial bearing evens out the differences in speed of rotation between the friction clutch 2 turning at engine speed and the lever 7 fixed to the housing.

In FIG. 1 the spring device, here in the form of a compression spring 9, the radially outer end of lever 7 with the contact point A, a roller unit 8 that is movable between the two ends of lever 7, with the contact point B, and the contact point C on the radially inner lever end resting on engagement bearing 12, are essentially in a single line of action. Friction clutch 2 is operated by shifting roller unit 8, which causes lever 7 to be moved at contact point C against the force of compression spring 9. In the exemplary embodiment shown, friction clutch 2 is disengaged; in consequence the contact points A and B coalesce when the roller unit is at its radially outermost position. To engage friction clutch 2, movable roller unit 8 runs directly inward on an essentially radial partial surface of lever 7, with support on a base plate or on the wall of the transmission housing. Lever 7 is not shown flat in FIG. 1. Rather it is to a certain extent concave-shaped, from the perspective of roller unit 8, which enables the development of force on the actuating lever 10 and thus on the friction surfaces of the friction clutch to be adapted. Roller unit 8 comprises a plurality of rollers 31, which roll in one case on the surface of lever 7 and in the other case on the base plate, depending on the direction of running.

At the position of roller unit 8 or of contact point B shown in FIG. 1, the tensioning force of energy storage element 9 acts on a lever arm with a length of zero. For that reason, no torque from lever 7 is able to act on engagement bearing 12. If roller unit 8 is now moved radially toward engagement bearing 12, the lever length between energy storage element 9 and fulcrum 8 continues to increase. At the same time, the lever length of the contact B to contact point C on engagement bearing 12, carried along with roller unit 8, becomes shorter. Shifting contact point B brings about a change in the force on engagement bearing 12, causing the engagement force to become greater the closer contact point B approaches engagement bearing 12. Conversely, because of the force relationships, absence of a force on roller unit 8 causes it to be moved radially outward away from engagement bearing 12, so that friction clutch 2 is disengaged again. That makes it possible to achieve a self-disengaging effect of friction clutch 2 in a simple manner. This effect is especially advantageous, in particular when used in a double clutch.

For example, in consequence of wear in the friction linings of the clutch plate 5 or relaxation of the lining resiliency between the friction linings and the clutch plate, the axial gap between pressure plate 3 and opposing pressure plate 6 is subject to changes over the operating life of friction clutch 2, which are manifested in part in a lengthening of the engagement travel of actuating lever 10. Such changes to the engagement path are manifested negatively in the design of the actuation system, since the components and the forces that occur in the friction clutch and in the actuation system should be designed for these changes over the service life. In the friction clutch 2 an adjusting device 14 is therefore provided which sets a compensation between clutch cover 4 and actuating lever 10 that corresponds to the incorrect gap between pressure plate 3 and opposing pressure plate 6, in that ramps that arise between these parts in the circumferential direction increase an axial interval through twisting. In the non-adjusting state of the clutch, these ramps are impeded for example by friction with regard to twisting in the circumferential direction, and thus in terms of an unwanted adjustment. If actuating lever 10 is moved more than a predetermined amount in the disengagement direction, it lifts off of adjusting device 14, and the ramps of the adjusting device can be twisted in the circumferential direction—supported for example by a spring device—until they have compensated for the gap that came about through the overtravel of the actuating lever 10, which ideally corresponds to the error in the gap. It goes without saying that other advantageous adjusting devices—such as for example the adjusting device described earlier with a spring-loaded worm gear, which compensates for only a limited engagement distance at each adjustment, —can also be beneficial, in particular if it is important to prevent the setting of excessively large adjustment paths.

It is therefore of critical importance for correct adjustment to set a correct overtravel distance. The lever engager 11 is therefore designed so that when friction clutch 2 is not engaged the lever 7 returns to a neutral position automatically, for example by spring-loading or driven by an actuator, for example an electric motor; the neutral position is formed in the non-actuating state by a stop 15 firmly attached to the housing, on which in addition a switchable stop 16 is situated. The axial positioning of both stops is laid out so that no adjustment occurs. If it is found as a result of an extended axial engagement path that an adjustment is necessary, the switchable stop 6 is removed from the axial path of the lever 7, so that the latter can traverse a longer overtravel distance beyond the neutral position, which results in an exact adjustment on the adjusting device 14. More advanced designs for how a switchable stop can be constructed to switch automatically will be described in the subsequent figures.

FIGS. 2a through 2d show a schematic view of a switchable stop 16 in various operating or functional states. The constructional features underlying FIGS. 2a-2d will be described first. A controlling component 17 and a controlled component 18 are assigned to lever 7 in order to act on the actuating lever 10 (FIG. 1) of the friction clutch. The controlling component 17 is carried along by lever 7 on one side in the engagement direction E of the friction clutch, against a return force of a spring device 21, and has a ramp 19 by means of which the controlled component 18 is displaced perpendicular to the direction of motion of engagement direction E against a return force of a spring device 22 through the action of ramp 19 on a corresponding opposing ramp 20 provided on the controlled component 18. Furthermore, controlled component 18 has a locating key 23 and lever 7 an unblocking profile 24 that enters into interaction with the unblocking edge 25 of controlled component 18. Controlled component 18 with its pivotable stop 16 gives the possibility of switching an overtravel path that depends on the engagement path E.

Figure 2A:
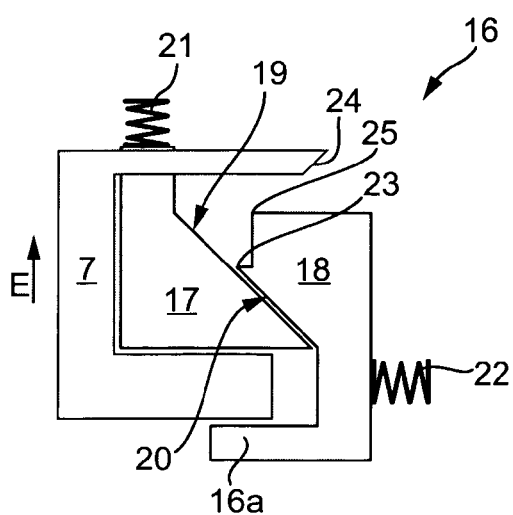
FIGS. 2a-2d: a schematic depiction of various functional states of a switchable stop.

The function is depicted in four stages in FIGS. 2a through 2d. FIG. 2a shows the untensioned position of a disengaged friction clutch. Lever 7 rests on stop 16a in its maximally retracted position in this stage; both components 17, 18 are in a non-tensioned position except for desired pre-tensioning of spring devices 21, 22.

Figure 2B:
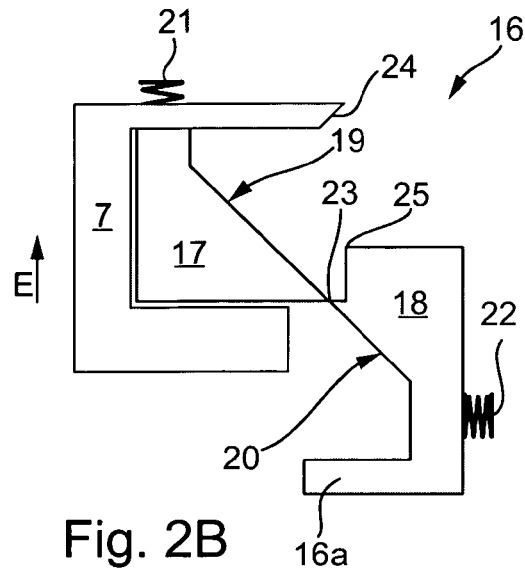

FIG. 2b shows the state of an engaged friction clutch in which adjustment is not yet necessary. The carrying along of controlling component 17 against the force of spring device 21 effected by a shift of lever 7 in engagement direction E brings about a displacement of controlled component 18 against the force of spring device 22 through opposing ramp 20 sliding off of ramp 19. While that already swivels out the switchable stop 16 which is integrated into controlled component 18 in proportion to the distance covered by the lever, when the clutch is disengaged in this state controlled component 18 along with stop 16a returns to the initial position, since controlled component 18 is moved back again by its spring device.

Figure 2C:
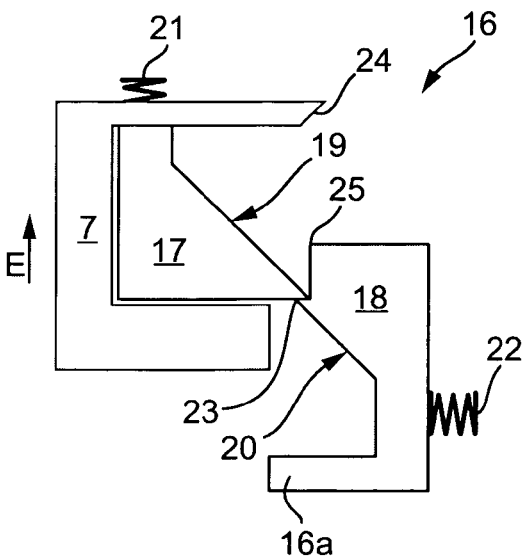

In FIG. 2c the engagement distance has become so great that the edge of the locating key 23 has been passed. The interval of the locating key is chosen so that a necessary adjustment is initiated when the edge is passed. As a result of the application of the force of spring device 22, controlling component 17 and controlled component 18 are fixed relative to each other. When the friction clutch is disengaged again, lever 7 is moved contrary to the direction of engagement without controlling component 18. Since controlled component 18 also does not return to its starting position, stop 16a is not operative for lever 7, and an overtravel is set to a stop located further back and fixed on the housing, which results in an adjustment process on the friction clutch with compensation for the incorrect gap.

Figure 2D:
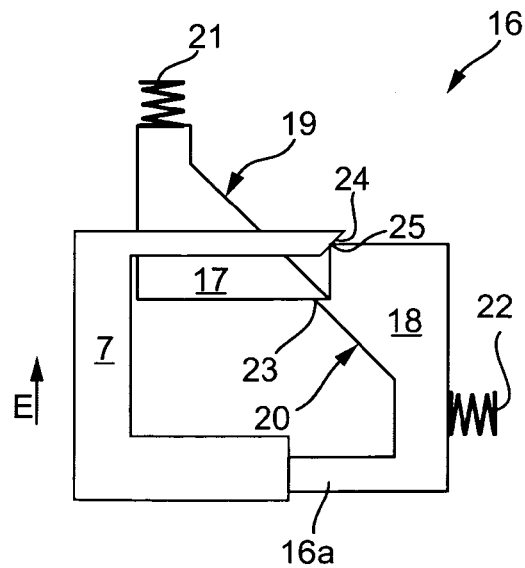

FIG. 2d depicts the unblocking of the fixing of the two components 18, 19 relative to each other. When it overtravels to the stop affixed to the housing, lever 7 acts here by means of its unblocking profile 25 on the unblocking edge 25 provided on controlled component 18. Through the action of lever 7 on unblocking edge 25, controlled component 18 is shifted further against the effect of spring device 22; the controlled component is released and returns to lever 7, supported by spring device 21. At the next engagement process, opposing ramp 20 of controlled component 18 then finally comes into contact again with ramp 19 of the controlling component.

Figure 3:
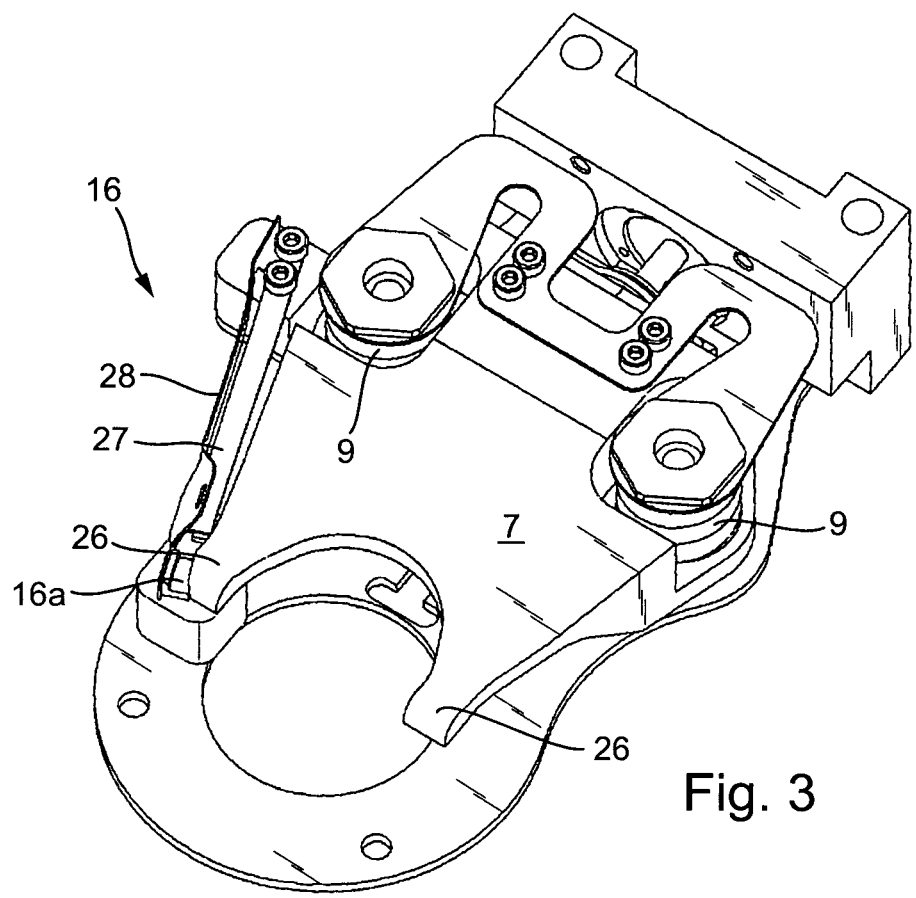
FIG. 3: a lever engager with a switched stop.

FIG. 3 shows an exemplary embodiment of a lever engager 11 with a switchable stop 16. Lever 7 is moved by a roller unit against the effect of the compression springs 9; at the same time a corresponding axial motion occurs at the lever ends 26, which is transmitted through an engagement bearing to the actuating lever of the friction clutch. See FIG. 1 for the principle of operation.

In the exemplary embodiment shown, the switchable stop 16 is made up of two leaf springs 27, 28 joined together in a single piece, which are clamped firmly to the housing by one end and when pivoted return by themselves to the starting position, so that the spring devices depicted in FIGS. 2a-2d can be dispensed with or are integrated into the leaf springs. The controlling leaf spring 27 is flexible in the direction of motion of lever 7, and is carried along by the latter by means of a lug 29 provided on the lever. The controlled leaf spring 28 is flexible perpendicular to the direction of motion of lever 7, and receives the stop 16a at its end.

Figure 4:
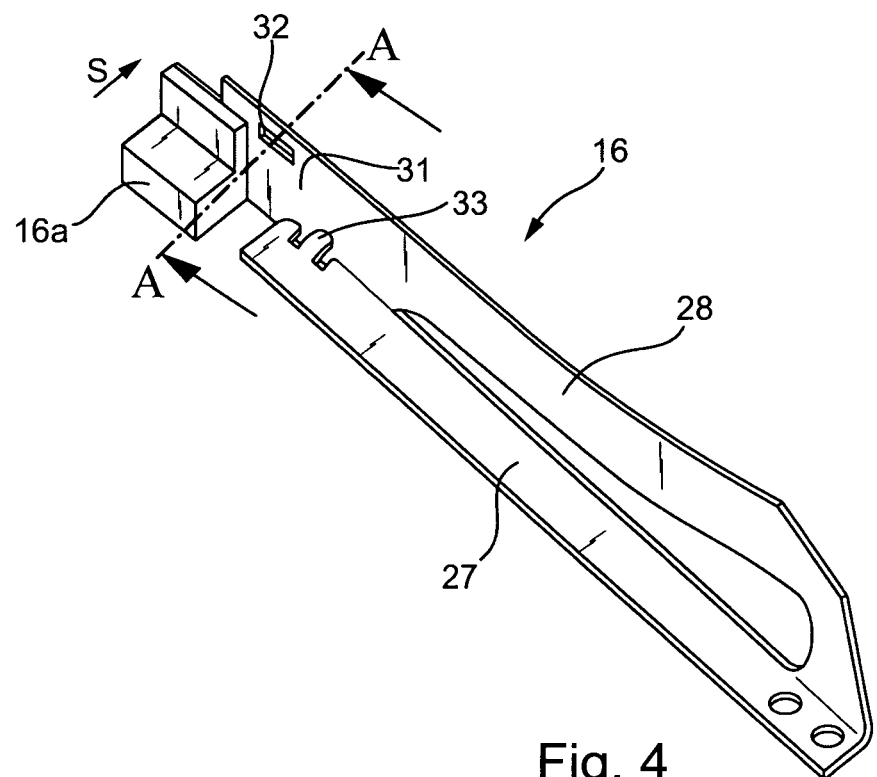
FIG. 4: an exemplary embodiment of a switched stop made of leaf springs.
Figure 5:
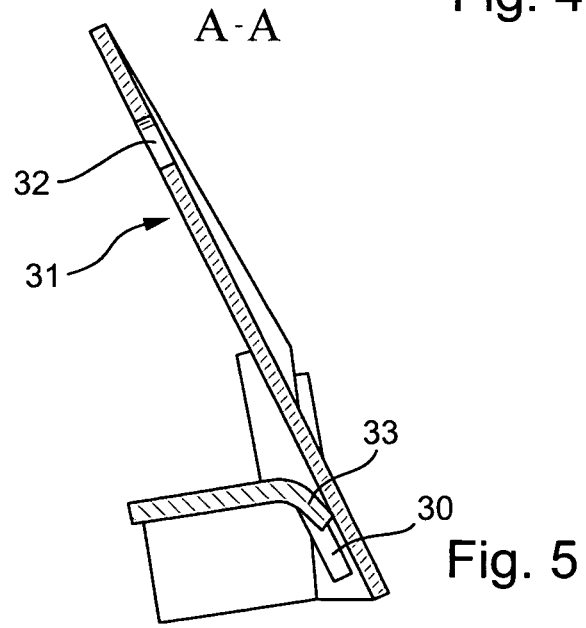
FIG. 5: a section along cutting line A-A through the exemplary embodiment of FIG. 4, and FIG. 6: a side view of an exemplary embodiment of a switched stop.

To clarify the function and arrangement of the switchable stop 16 of FIG. 3, it is depicted schematically in FIG. 4 in an isolated view. Advantageously, switchable stop 16 is stamped from spring sheet steel and is appropriately pre-bent. The stop 16a is situated at the non-clamped end of controlled leaf spring 28. For example, an appropriately shaped metal piece is riveted, spot welded or welded on. A profile 30 is formed in the controlling leaf spring 27, for example by stamping, which interacts with a correspondingly formed opposing profile 31 when in the installed state, so that when controlling leaf spring moves 27 while being carried along by lever 7 (FIG. 3), controlled leaf spring 28 and thus stop 16a are moved in the direction of pivoting S. Corresponding to a position in which an adjustment of the friction clutch is to take place, controlled leaf spring 28 has an opening 32 which is engaged by a locating key 33 provided in leaf spring 27, for example projecting from it, when opening 32 is reached, bringing about a fixing of the two leaf springs relative to each other. The section along cutting line A-A depicted in FIG. 5 makes the arrangement and design of the opposing profile 31 with the opening 32 clear, which is acted on by profile 30 with locating key 33.

Figure 6:
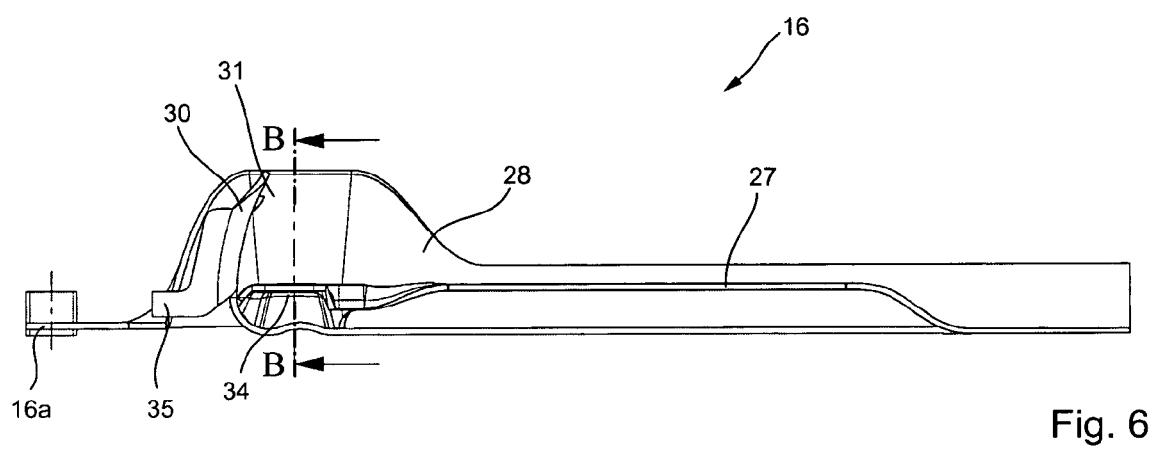

FIG. 6 shows another slightly modified alternative of a switched stop 16 in side view, with a controlling leaf spring 27 and a controlled leaf spring 28 to which the stop 16a is attached. Controlling leaf spring 27 itself has a driver lug 34, which lies on or is hooked into the lever of the actuating system. In this way, an appropriately designed lever can remain unchanged. Profile 30 and opposing profile 31 are designed in accordance with the embodiments shown in FIG. 4. Furthermore—contrary to the exemplary embodiments described in relation to FIGS. 2a-2d—an unblocking lug 35 is provided on the controlling leaf spring 27 which separates the fixing between the opening and the locating key when acted on by the lever.

REFERENCE LABELS 1 clutch system
2 friction clutch
3 pressure plate
4 clutch cover
5 clutch plate
6 opposing pressure plate
7 lever
8 roller unit
9 compression spring
10 actuating lever
11 lever engager
12 engaging bearing
13 support
14 adjusting device
15 fixed stop on the housing
16 switchable stop
16a stop
17 controlling component
18 controlled component
19 ramp
20 opposing ramp
21 spring device
22 spring device
23 locating key
24 unblocking profile
25 unblocking edge
26 lever end
27 controlling leaf spring
28 controlled leaf spring
29 lug
30 profile
31 opposing profile
32 opening
33 locating key
34 driver lug
35 unblocking lug
E engagement direction
S direction of swiveling

What is claimed is:

1. A friction clutch for a motor vehicle, the friction clutch being disengaged when in an unpowered state and, in the event of overtravel traversed beyond the unpowered state, compensates for an incorrect axial gap between the friction surfaces provided in a friction clutch caused by wear, the friction clutch comprising:

an actuating lever axially movable for engaging the friction clutch;

an actuating device including a further lever operating the actuating lever; and a switchable stop provided on the actuating device, the switchable stop releasing the further lever into an overtravel path when a detected engagement path of the further lever exceeds a predefined length, the switchable stop including a controlling component and a controlled component, the controlling component and the controlled component being fixable relative to each other, by a key of the controlling component engaging the controlled component, to initiate releasing the further lever into the overtravel path.

2. The friction clutch as recited in claim 1 wherein the switchable stop prevents the overtravel from occurring again after the incorrect axial gap has been compensated for.

3. The friction clutch as recited in claim 1 wherein the switchable stop includes a further stop for the further lever, the controlling component having a ramp, the controlled component having an opposing ramp, the further lever in the course of actuation carries along the controlling component against a first return force, the controlling component acting on the controlled component, the controlled component moving traverse to the axial motion of the further lever against a second return force.

4. The friction clutch as recited in claim 3 wherein with the engagement path the controlling component and the controlled component become fixed in a current position, while in the current position the further stop is inoperative for the further lever and the further lever traverses the necessary overtravel distance to compensate for the incorrect axial gap.

5. The friction clutch as recited in claim 3 wherein the further lever has an unblocking profile displacing the controlled component beyond a current position against the second return force when traversing the overtravel path, so that the fixing of the controlling and controlled components is released again.

6. The friction clutch as recited in claim 3 wherein the controlling component is formed by a controlling leaf spring clamped in place on one end of the controlling leaf spring, a free end of the controlling leaf spring having a profile forming the ramp carried along by the further lever during an engagement process, against the first return force formed by the leaf spring constant.

7. The friction clutch as recited in claim 6 wherein the controlled component is formed by a controlled leaf spring clamped in place by one end, a free end of the controlled leaf spring having an opposing profile forming the opposing ramp corresponding to the profile of the controlling leaf spring, and during an engagement process moving contrary to the second return force from the controlling leaf spring, which is formed by the leaf spring constant and acts perpendicular to the first return force, while the further stop attached to the controlled leaf spring swivels out of a contact surface with the further lever as the engagement travel distance increases.

8. The friction clutch as recited in claim 7 wherein with a position of the profile and the opposing profile relative to each other that corresponds to a prescribed engagement distance at which the incorrect axial gap is to be compensated for, an opening in one of the controlling and controlled leaf spring is engaged by a locating key of the other of the controlling or controlled leaf spring, in the opening so that in this position the controlling and controlled leaf springs are positionally fixed relative to each other.

9. The friction clutch as recited in claim 8 wherein after the compensation for the incorrect axial gap the position fixing is suspended by an unblocking profile on the further lever, the unblocking profile moving the controlled leaf spring against the controlling leaf spring against the second return force far enough so that the opening and the locating key are separated from each other again.

10. The friction clutch as recited in claim 7 wherein the controlling and controlled leaf springs are stamped and bended in one piece.

11. The friction clutch as recited in claim 7 wherein the further stop is riveted to the controlled leaf spring.

12. A friction clutch for a motor vehicle, the friction clutch being disengaged when in an unpowered state and, in the event of overtravel traversed beyond the unpowered state, compensates for an incorrect axial gap between the friction surfaces provided in a friction clutch caused by wear, the friction clutch comprising:
an actuating lever axially movable for engaging the friction clutch;
an actuating device including a further lever operating the actuating lever; and
a switchable stop provided on the actuating device, the switchable stop releasing the further lever into an overtravel path when a detected engagement path of the further lever exceeds a predefined length, the switchable stop including a controlling component and a controlled component, the controlling component and the controlled component being fixable relative to each other to initiate releasing the further lever into the overtravel path,
wherein the switchable stop includes a further stop for the further lever, the controlling component having a ramp, the controlled component having an opposing ramp, the further lever in the course of actuation carries along the controlling component against a first return force, the controlling component acting on the controlled component, the controlled component moving traverse to the axial motion of the further lever against a second return force,
wherein the controlling component is formed by a controlling leaf spring clamped in place on one end of the controlling leaf spring, a free end of the controlling leaf spring having a profile forming the ramp carried along by the further lever during an engagement process, against the first return force formed by the leaf spring constant.

13. The friction clutch as recited in claim 12 wherein the controlled component is formed by a controlled leaf spring clamped in place by one end, a free end of the controlled leaf spring having an opposing profile forming the opposing ramp corresponding to the profile of the controlling leaf spring, and during an engagement process moving contrary to the second return force from the controlling leaf spring, which is formed by the leaf spring constant and acts perpendicular to the first return force, while the further stop attached to the controlled leaf spring swivels out of a contact surface with the further lever as the engagement travel distance increases.

14. The friction clutch as recited in claim 13 wherein with a position of the profile and the opposing profile relative to each other that corresponds to a prescribed engagement distance at which the incorrect axial gap is to be compensated for, an opening in one of the controlling and controlled leaf spring is engaged by a locating key of the other of the controlling or controlled leaf spring, in the opening so that in this position the controlling and controlled leaf springs are positionally fixed relative to each other.

15. The friction clutch as recited in claim 14 wherein after the compensation for the incorrect axial gap the position fixing is suspended by an unblocking profile on the further lever, the unblocking profile moving the controlled leaf spring against the controlling leaf spring against the second return force far enough so that the opening and the locating key are separated from each other again.

16. The friction clutch as recited in claim 13 wherein the controlling and controlled leaf springs are stamped and bended in one piece.

17. The friction clutch as recited in claim 13 wherein the further stop is riveted to the controlled leaf spring.

18. The friction clutch as recited in claim 1 wherein the controlled component and the controlling component are releasable from being fixed together by the further lever contacting the controlled component.

19. A friction clutch for a motor vehicle, the friction clutch being disengaged when in an unpowered state and, in the event of overtravel traversed beyond the unpowered state, compensates for an incorrect axial gap between the friction surfaces provided in a friction clutch caused by wear, the friction clutch comprising:
   an actuating lever axially movable for engaging the friction clutch;
   an actuating device including a further lever operating the actuating lever; and
   a switchable stop provided on the actuating device, the switchable stop releasing the further lever into an overtravel path when a detected engagement path of the further lever exceeds a predefined length, the switchable stop including a first leaf spring and a second leaf spring fixed together at a first end of the switchable stop and being further fixable together to initiate releasing the further lever into the overtravel path.

20. The friction clutch as recited in claim 19 wherein the first leaf spring and the second leaf spring are fixable to each other by a key of the first leaf spring engaging an opening in the second leaf spring.

\* \* \* \* \*